US012586026B1

(12) United States Patent
Yan et al.

(10) Patent No.: US 12,586,026 B1
(45) Date of Patent: Mar. 24, 2026

(54) DELIVERY ARRIVAL TIME PREDICTION SYSTEM

(71) Applicant: Amazon Technologies, Inc., Seattle, WA (US)

(72) Inventors: Rui Yan, Bothell, WA (US); Hansu Gu, Bellevue, WA (US); Anupama Umesh Kochrekar, Redmond, WA (US); Sridevi Venkatramanan, Bellevue, WA (US); Feng Zhu, Bothell, WA (US); Tian Chen, Redmond, WA (US); Tao Hu, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/138,662

(22) Filed: Apr. 24, 2023

(51) Int. Cl.
G06Q 10/0833 (2023.01)
G06Q 10/083 (2023.01)
(52) U.S. Cl.
CPC ..... *G06Q 10/0833* (2013.01); *G06Q 10/0838* (2013.01)
(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS 11,501,247 B1 * 11/2022 Sahasrabudhe ........ G06N 20/00
2017/0154347 A1 * 6/2017 Bateman ............ G06Q 10/0838
2019/0303857 A1 * 10/2019 Lecue ..................... G06F 16/29
2021/0103888 A1 * 4/2021 Mohamed .......... G06Q 10/0838

OTHER PUBLICATIONS

Sørensen, Kristian Aalling, Automatic Identification System tracking of ships using Neural Networks and correlation with satellite images. Diss. Thesis for: Earth and Space Physics and Engineering. Heiselberg's Lab, 2021. DOI: 10.6084/m9. figshare. 14604759. v4, 2021 (Year: 2021).*
Jiang, Jun, Ran Ma, and Guicheng Shen. "Research on parallel distribution routing optimization based on improved reinforcement learning algorithm." 2021 IEEE International Conference on Advances in Electrical Engineering and Computer Applications (AEECA). IEEE, 2021. (Year: 2021).*
Bordes et al., "Translating Embeddings for Modeling Multi-Relational Data," Advances in Neural Information Processing Systems, vol. 26, 2013, pp. 1-9.

(Continued)

*Primary Examiner* — Emmett K. Walsh
(74) *Attorney, Agent, or Firm* — Kilpatrick Townsend & Stockton LLP

(57) ABSTRACT
A system for estimating a delivery is disclosed. The system generates delivery time predictions, and generates a confidence score for each time prediction. The system also generates a publication determination for each particular time prediction based on the confidence score associated with each particular time prediction. The publication determination indicates whether to publish the particular time prediction or to not publish the particular time prediction.

19 Claims, 9 Drawing Sheets

100

(56) References Cited

OTHER PUBLICATIONS

Kandula et al., "A Prescriptive Analytics Framework for Efficient E-commerce Order Delivery," Decision Support Systems, vol. 147, Aug. 2021, 12 pages.
Li et al., "Unsupervised Categorical Representation Learning for Package Arrival Time Prediction," Proceedings of the 30th ACM International Conference on Information and Knowledge Management, Nov. 1-5, 2021, pp. 3935-3944.
Wu et al., "DeepETA: A Spatial-Temporal Sequential Neural Network Model for Estimating Time of Arrival in Package Delivery System," Proceedings of the AAAI Conference on Artificial Intelligence, vol. 33, No. 1, 2019, pp. 774-781.

* cited by examiner

500

$$\text{softmax}\left(\frac{Q \times K^T}{\sqrt{d_k}}\right) V = Z$$

Q: query
K: key
V: value
Z: vector of self attention

810

Train Knowledge
Embedding Layer
of Predictor

820

Train Route
Encoder of
Predictor

830

Train Evaluator

840

Generate Object
Delivery Time
Estimates

850

Evaluate Object
Delivery Time
Estimates

860

Determine
Confidence of
Object Delivery
Time Estimates

870

Pulbish High-
Confidence Object
Delivery Time
Estimates

DELIVERY ARRIVAL TIME PREDICTION SYSTEM

Object delivery arrival time for a sequence of object deliveries is preferably known and reported to various entities. For example, delivery recipients and delivery system management entities benefit from accurate estimates of delivery arrival times. Improved estimation systems are needed in the art.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Various embodiments in accordance with the present disclosure will be described with reference to the drawings, in which.

DETAILED DESCRIPTION

Figure 1:
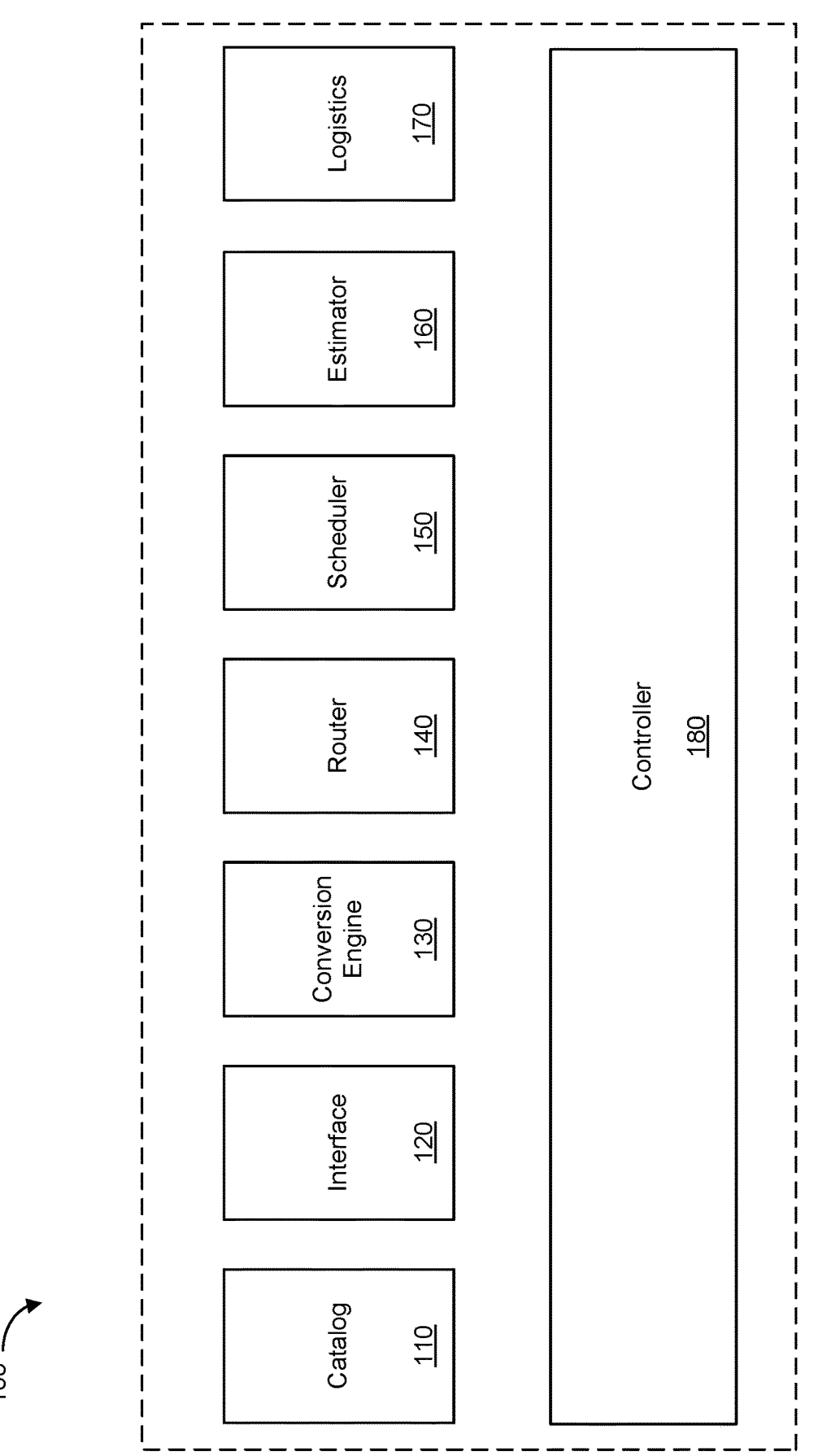
FIG. 1 illustrates a simplified block diagram of an object management system according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The embodiments of object delivery time estimation systems discussed herein have various advantageous aspects. These advantageous aspects include:

improved estimation resolution, such as delivery windows in days, hours, minutes, or seconds;

estimation evaluation that determines confidence scores for object delivery time estimates, predictions, which brings valuable benefits to further control the prediction accuracy and provide better experiences for interested entities; and use of, for example, knowledge graph and multi-headed attention architecture to generate object delivery time estimates.

Embodiments of object management systems are discussed, which use object delivery time estimation systems for deliveries to provide highly stable accurate predicted arrival time and more transparency for customers' object arrival times. The systems are effective to reduce the delivery failure, to save cost, and to improve customer preparedness for drivers' safe object delivery processes. The object management systems are effective for any object delivery system.

For example, large logistic companies such as USPS, Fedex, UPS, DHL, companies offering physical items, such as Amazon, Walmart, Target, and others, and point-to-point delivery providers, such as food delivery business of companies such as Uber, DoorDash, GrubHub, etc., may benefit from object management systems having features of the embodiments discussed herein.

Embodiments of the object delivery time estimation systems provide, for example, (1) fine granularity, (2) stable, and (3) highly accurate arrival time prediction, for example, in minutes/seconds.

Embodiments of the object delivery time estimation systems may include two major components: (1) an arrival time predictor, and (2) an arrival time prediction evaluator. The arrival time predictor predicts object delivery times based on given inputs, and the arrival time prediction evaluator examines predictions and generates a confidence score to determine whether to publish the arrival time predictions made by the arrival time predictor.

In some embodiments, the arrival time predictor has one or more artificial intelligence engines which are trained using, for example, 4 types of features: (1) knowledge features, for example, including driver knowledge features and address knowledge features, (2) route encodings, (3) dynamic features, and (4) package features. In some embodiments, these features are concatenated and fed into a fully connected neural net layer. The training targets are the exact time interval between the most recent visited stop and all to-be-visited stops in the delivery schedule. In some embodiments, a minimum square error is used as a loss function.

In some embodiments, the arrival time prediction evaluator uses an XG-boost model with a calibration layer trained with historical data. In some embodiments, the features are built on top of stops/packages/context, such as "stops_to_delivery", "is_weekday", "total_packages", "driver_performance", etc. The training labels may be derived by comparing historical arrival time predictions from the arrival time predictor with the corresponding actual object delivery times. For example, if the predicted time falls into a particular window around the actual time, the label is 1, otherwise is 0.

From the customer experience perspective, the system provides accurate object delivery arrival time estimation with a resolution of minutes, for example, 6:03 PM. This makes it more flexible for customers to arrange their time to expect the packages, guarantees a safer and more timely delivery process for the driver, and reduces cost to avoid failed deliveries.

FIG. 1 illustrates a simplified block diagram of an object management system 100 according to some embodiments. Object management system 100 is configured to perform the functions described above and to perform the processes described with reference to FIGS. 2-7.

Object management system 100 includes catalog system 110, interface 120, conversion engine 130, router 140, scheduler 150, estimator 160, logistics system 170, and controller 180. Each of the components of object management system 100 is communicatively coupled with one or more other components of object management system 100 through one or more communication connections (not shown). The connections are not shown to simplify the figure as numerous connection configurations are contemplated, embodiments of particular connection configurations are taught and/or suggested by descriptions of functionality, and embodiments are not limited to a particular connection configuration.

Catalog system 110 includes a database of numerous objects and various aspects of each of the numerous objects. For example, objects of the catalog system 110 may have aspects including description, price, availability, customization options, delivery options, size options, and other aspects.

Interface 120 is configured to present a customer facing application programming interface (API) which searchably presents the objects of catalog system 110 along with the various aspects of each of the objects. In some embodiments, interface 120 presents one or more purchase options for the objects of catalog system 110. In some embodiments, interface 120 presents one or more delivery options which allow for selection of delivery options for the objects of catalog system 110.

Conversion engine 130 is configured to receive data indicating a purchase, and to communicate corresponding descriptive data to router 140, scheduler 150, estimator 160, and logistics system 170. The descriptive data may, for example, include an identification of the associated object of catalog system 110, one or more delivery options, an identification of a delivery destination, and one or more other associated characteristics.

Router 140 is configured to receive data from conversion engine 130 and/or one or more other components of object management system 100, and to generate route information for one or more delivery mechanisms. The delivery mechanisms may include any type of delivery mechanism, such as trucks, vans, and other delivery vehicles. In some embodiments, the route information includes an identification of a particular delivery vehicle, an identification of a particular delivery vehicle operator, identification of a number of objects to be delivered, identification of a number of delivery destinations corresponding with each of the objects to be delivered, and a particular sequence identifying an order in which the objects are to be delivered.

Scheduler 150 is configured to receive data from router 140 and/or one or more other components of object management system 100, and to generate schedule information, for example for particular delivery vehicles and for particular delivery vehicle operators. Accordingly, scheduler 150 helps ensure that an appropriate number of delivery vehicles and delivery vehicle operators are available to deliver the objects to be delivered.

Estimator 160 is configured to receive data from router 140, scheduler 150, and/or one or more other components of object management system 100, and to generate and publish delivery time estimates according to the various features of the embodiments discussed herein.

Logistics system 170 is configured to receive data from router 140, scheduler 150, and/or one or more other components of object management system 100, and, in response to and according to the received data, cause various systems and processes to provide the objects to be delivered to the various corresponding delivery vehicles.

Controller 180 is communicatively coupled, for example, with each of catalog system 110, interface 120, conversion engine 130, router 140, scheduler 150, estimator 160, and logistics system 170, and is configured to generate control signals for each of the coupled components. The control signals cause the components to perform the functions described elsewhere herein. In some embodiments, control signals cause a first component to transmit data to a second component via the controller 180. In some embodiments, control signals cause a first component to transmit data directly to a second component. In some embodiments, control signals cause a first component to transmit data to a second component via one or more other components.

Figure 2:
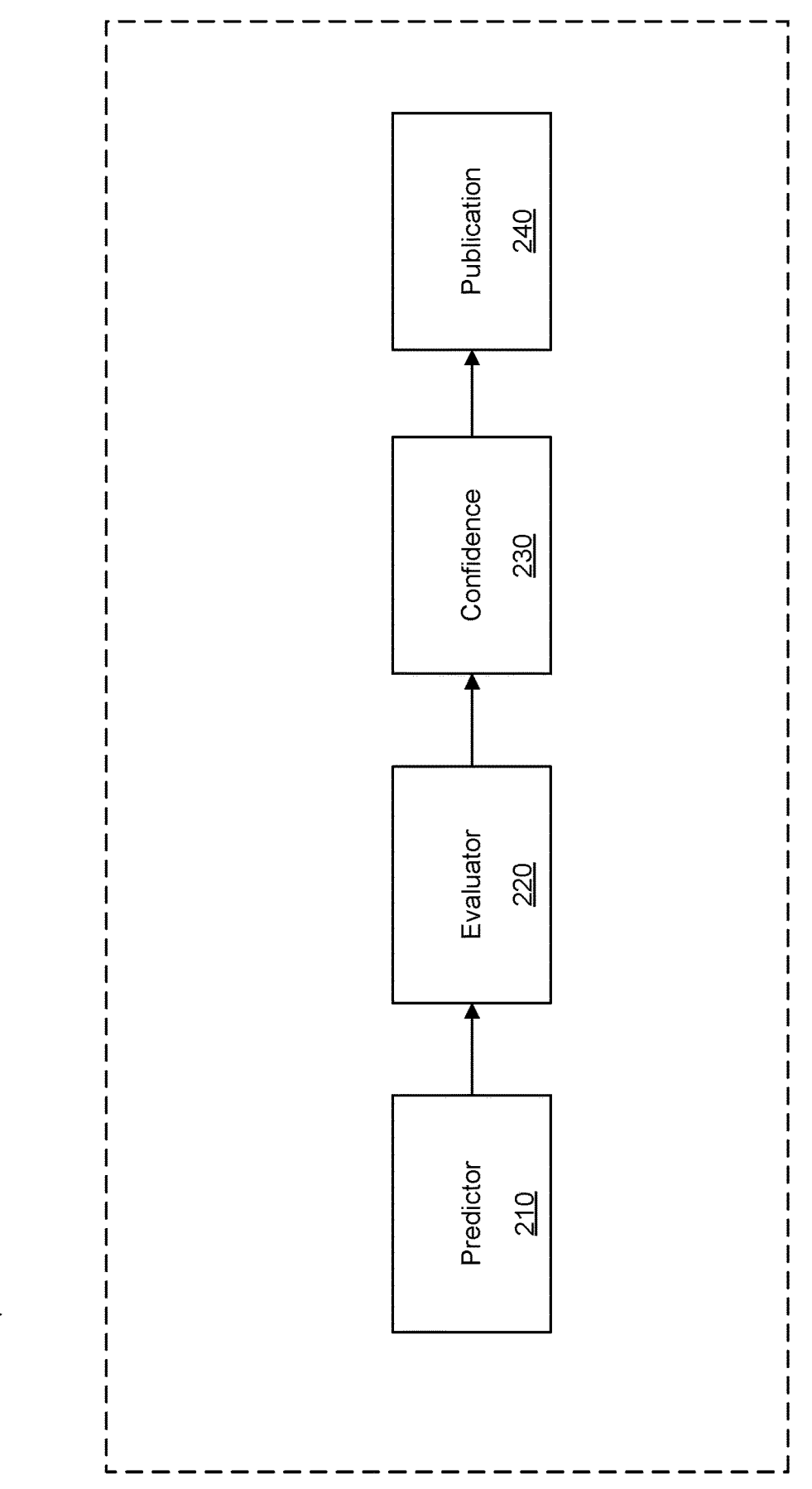
FIG. 2 is a block diagram of an object delivery time estimation system according to some embodiments.

FIG. 2 is a block diagram of an object delivery time estimation system 200 according to some embodiments. Object delivery time estimation system 200 may, for example, be used as estimator 160 of object management system 100. Object delivery time estimation system 200 may be used in other embodiments of object management systems, and object management systems may use alternative embodiments of object delivery time estimation system 200.

Object delivery time estimation system 200 includes predictor 210, evaluator 220, confidence determination system 230, and publication system 240. Predictor 210 predicts object delivery times based on certain inputs, and the evaluator 220 examines predictions and generates a confidence score to determine whether to publish the object delivery time predictions made by the predictor 210.

At a high level, the predictor 210 solves a regression problem to predict the time interval between a most recently completed delivery stop and all future delivery stops in the corresponding schedule to generate object delivery time predictions. Accordingly, the predictions for all future delivery stops are recalculated at or after each completed delivery stop, for example, in response to the completion of each completed delivery stop. At least partly because of the prediction generation features discussed herein, the predictions are sufficiently accurate that they may be published with high resolution. For example, in some embodiments, the predictions are published with single minute resolution.

Figure 6:
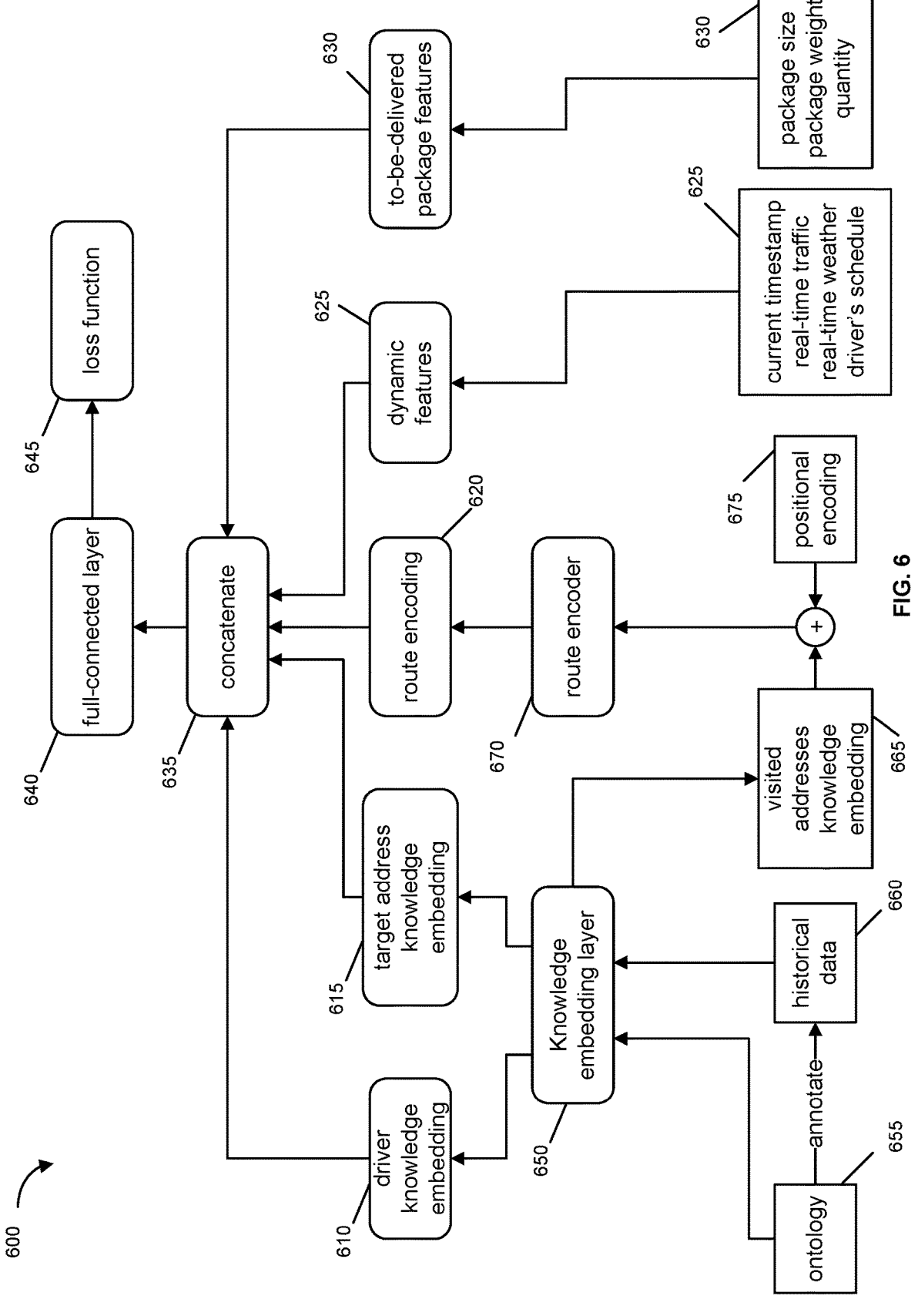
FIG. 6 is a system block diagram of a system which trains one or more AI engines of the object delivery time estimation system of FIG. 2 according to some embodiments.

In some embodiments, the predictor 210 has one or more artificial intelligence (AI) engines which are trained using, for example, 4 types of features: (1) knowledge features, for example, including driver knowledge features and address knowledge features, (2) route encodings, (3) dynamic features, and (4) package features. In some embodiments, these features are concatenated and fed into a fully connected neural net layer. The training targets are high-resolution time intervals between the most recent visited stop and all to-be-visited stops in the delivery schedule. In some embodiments, a minimum square error is used as a loss function. An embodiment of training for the predictor 210 is illustrated in FIG. 6, discussed below.

The knowledge features may be, for example, knowledge embeddings based on a curated ontology, for example, such as that illustrated in FIG. 3, described below. Other ontological schemes may be used. The ontology describes relations among, for example, drivers, deliveries, packages, and addresses. The ontology is built according to historical data, so that the ontology represents a knowledge graph rich in semantics. The knowledge graph may include hundreds of millions of vertices and edges. Accordingly, the knowledge graph represents embeddings for delivery vehicle operators and object delivery destinations as knowledge features. For example, the driver knowledge features may include driver route sequence adherence patterns, such as historical and current patterns of driver adherence to a planned stop sequence of deliveries. In some embodiments, the driver knowledge features may include driver preferences, such as a driver's geographical affinity, area familiarity, break preferences, or other delivery time-affecting factors of the driver's history. In some embodiments, the address knowledge features include time spent at an address, whether to expect a dog at the address, or other delivery time-affecting factors in the history of deliveries to the address.

One or more AI engines for the knowledge features may, for example, be trained according to aspects of the training system 600 described below with reference to FIG. 6.

The route encodings may, for example, be generated by a route encoder, for example, performing a method such as that described with reference to FIG. 4. One or more AI engines for the route encodings may, for example, be trained according to aspects of the training system 600 described below with reference to FIG. 6.

The dynamic features may be related to characteristics or circumstances which may change over time or are subject to change over the time of a delivery route or over the time between adjacent stops of a delivery route. The dynamic features may, for example, include current timestamp, traffic, real-time weather, weather predictions, and driver's schedule (e.g., driver breaks, meal times, etc). These features are used to provide "dynamic" information, are received by predictor 210, and are used by predictor 210 to generate object delivery time predictions.

The package features may, for example, be specifically related to particular features of the objects to be delivered, including size, weight, etc.

One or more AI engines of predictor 210 may, for example, be trained according to aspects of the training system 600 described below with reference to FIG. 6.

At a high level, the evaluator 220 solves a binary classification problem to assess each prediction with a confidence score, and applies a threshold to determine high-confidence predictions.

In some embodiments, the arrival time prediction evaluator 220 uses an XG-boost model with a calibration layer trained with historical data. In some embodiments, the features are built on top of stops/packages/context, such as "stops_to_delivery", "is_weekday", "total_packages", "driver_performance", etc. The training labels may be derived by comparing historical arrival time predictions from the arrival time predictor with the corresponding actual object delivery times. For example, if the predicted time falls into a particular window around the actual time, the label is 1, otherwise it is 0.

At least partly because of the prediction evaluation features discussed herein, the predictions are sufficiently accurate that they may be published with high resolution. For example, in some embodiments, the predictions are published with single minute resolution.

Confidence determination system 230 receives the confidence scores for each arrival time estimate and determines whether to publish data representing the arrival time estimates by pushing notifications to users. Confidence determination system 230 determines whether to publish data representing the arrival time estimates by comparing the confidence scores associated with each arrival time estimate with a confidence threshold. Data representing the arrival time estimates are published by publication system 240 at least to corresponding individuals expecting deliveries for those arrival time estimates having confidence scores representing a confidence exceeding the confidence threshold. In some embodiments, data representing the arrival time estimates are not published by publication system 240 at least to corresponding individuals expecting deliveries for those arrival time estimates having confidence scores representing a confidence less than the confidence threshold.

In some embodiments, training the confidence determination system 230 includes determining a threshold by threshold tuning. The target of threshold tuning may, for example, be or include optimizing or maximizing an F-score, for example, calculated based on precision and recall values using statistical analysis techniques understood by those of skill in the art. The threshold tuning may include, for example, 3 steps: (1) a threshold range is defined, for example, from 0 to 1, with, for example, a step of 0.001. So, in this example, there are 1000 threshold candidates; (2) each threshold candidate is applied confidence scores of all predictions of the training data, and F-scores are calculated for each threshold candidate; and (3) the threshold candidate having highest F-score is selected.

One or more AI engines of confidence determination system 230 may, for example, be trained according to aspects of the training system 600 described below with reference to FIG. 6.

Publication system 240 is configured to conditionally publish data representing arrival time estimates according to whether the corresponding confidence scores generated by confidence determination system 230 indicate sufficient confidence in the arrival time estimates.

At least partly because of the conditional publication features discussed herein, the predictions are published with high resolution. For example, in some embodiments, the predictions are published with single minute resolution.

Figure 3:
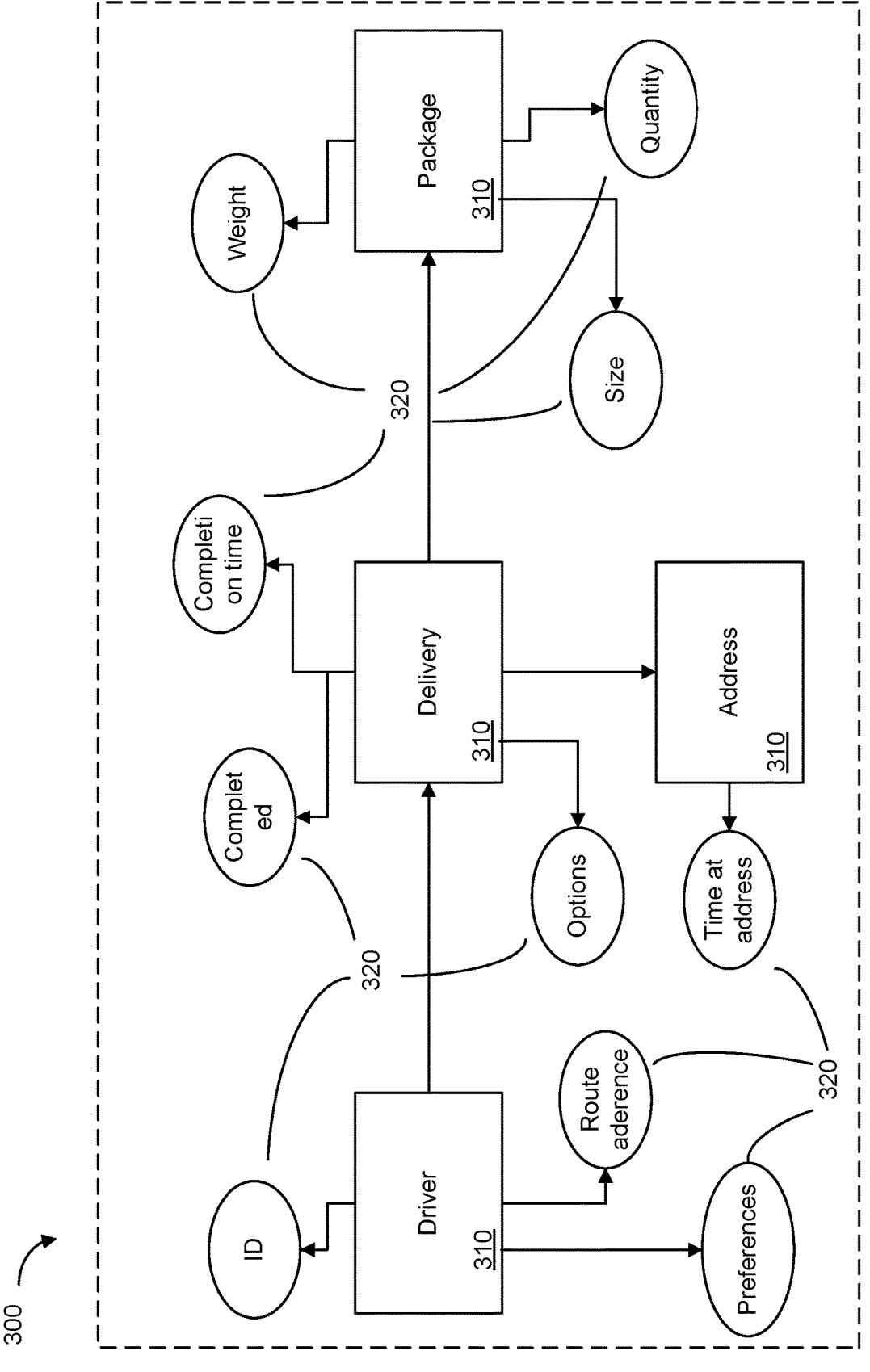
FIG. 3 illustrates a graphical representation of an ontology of an object distribution system.

FIG. 3 illustrates a graphical representation of an ontology 300 of a predictor, such as that of predictor 210 of object delivery time estimation system 200. The ontology 300 represent knowledge features as knowledge embeddings 310 and 320. The ontology 300 describes relations among, drivers, deliveries, packages, and addresses. The ontology 300 is built according to historical data, so that the ontology 300 represents a semantic knowledge graph. The knowledge graph may include hundreds of millions of vertices and edges. Accordingly, the knowledge graph represents knowledge embeddings for delivery vehicle operators and object delivery destinations as knowledge features.

In ontology 300, the rectangle shape features are classes 310, and oval shape features are properties 320 of the classes 310. For example, "driver" is a class, its instance could be a particular driver with an ID "dasdf1111", and the driver has a name property "Adam". In addition, "delivery" is another class, its instance could have an address, which, in some embodiments, is anonymized to protect privacy.

Ontology 300 may correspond with annotated discrete tabular historical delivery data into triples. Below is an annotation example:

driver_id, delivery_id, delivery_option, delivery_time, delivered dasdf1111, aiifdsasss, 1dc, 2022/01/23:11:45:00, yes The same data may be annotated by ontology 300 to enrich semantics. For example, as follows:

dasdf1111 is A driver;

aiifdsasss is A delivery;

dasdf1111 delivers aiifdsasss;

aiifdsasss has_delivery_option "1dc";

aiifdsasss has_time "2022/01/23:11:45:00";

aiifdsasss is_successful "True";

In some embodiments, after obtaining the knowledge graph, knowledge base embeddings are generated. In some embodiments, a TransE process is used to generate the knowledge base embeddings. In some embodiments, a TransE[4] process is used to generate the knowledge base embeddings. Other processes are used. In some embodiments, knowledge base embeddings are generated for each driver and address.

Figure 4:
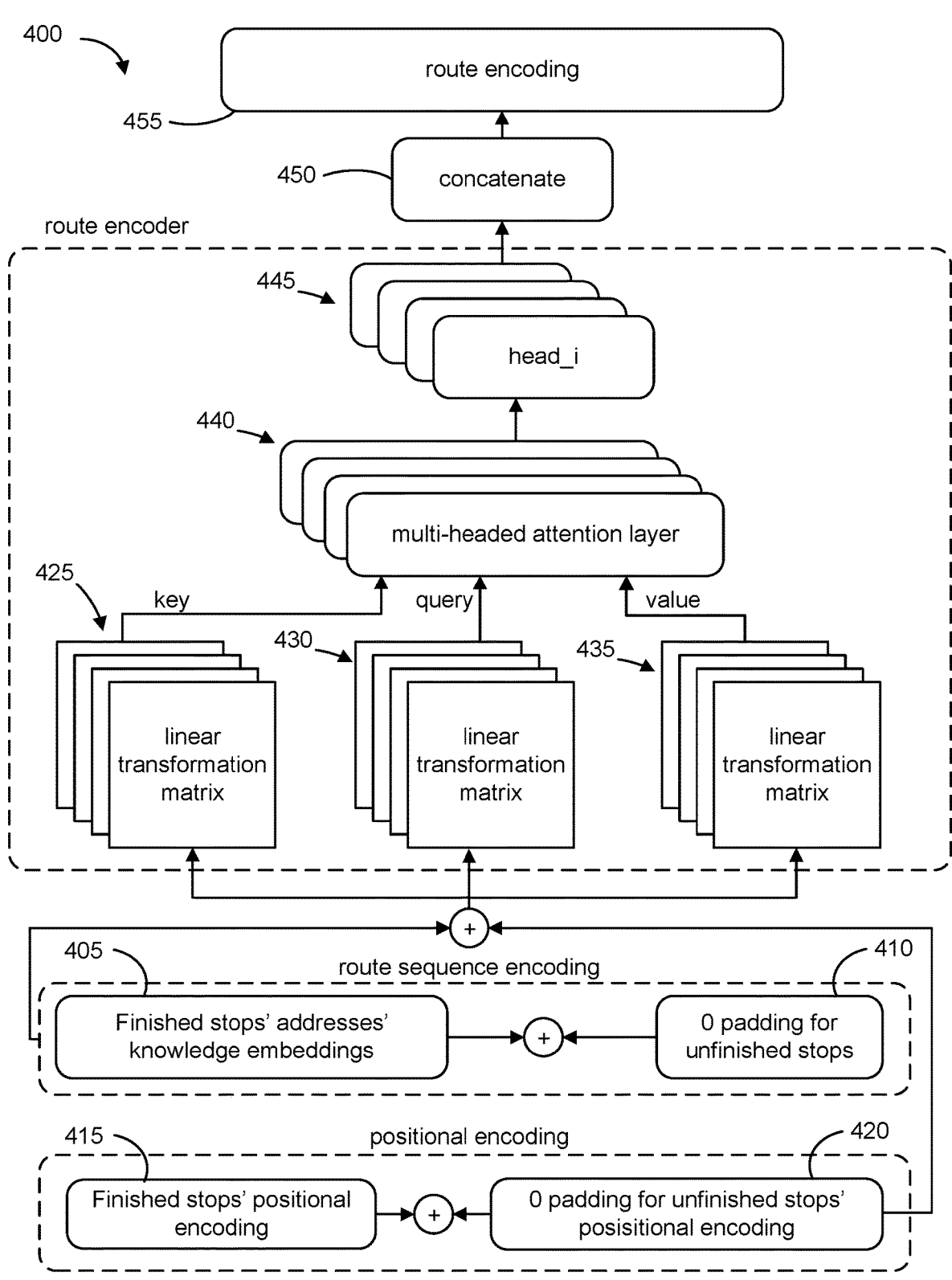
FIG. 4 is a flowchart diagram of a method of encoding object delivery routes according to some embodiments.

FIG. 4 is a flowchart diagram of a method 400 of encoding object delivery routes according to some embodiments, for example, to generate route encodings for a predictor, such as that of predictor 210 of object delivery time estimation system 200. Some or all of the process 400 (or any other processes described herein, or variations, and/or combinations thereof) may be performed under the control of one or more computer systems, for example, including a controller, such as controller 180, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

As illustrated, an input vector is provided to each of linear transform matrix systems 425, 430, and 435. The input vector includes: the finished stops' addresses' knowledge embedding sequence 405 padded with 0's representing unfinished stops 410. The input vector also includes and finished stops' positional encodings 415 padded with 0's representing unfinished stops 420. Accordingly, the finished stops are represented in the input vector in order according to the sequence of finished stops of the route.

The input vector is linear transformed by linear transform matrix systems 425, 430, and 435 to generate a key, a query, and a value, as illustrated. The linear transformation occurs many times, as illustrated, and the keys, queries, and values are provided to a multi-headed attention layer system 440 which generates vectors of self attention or attention heads 445, for example, according to a formula illustrated in FIG. 5, discussed below.

The attention heads 445 are concatenated at 450 to generate route encoding 455, as illustrated.

Figure 5:
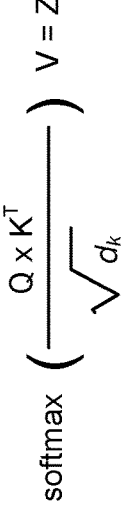
FIG. 5 illustrates a graphical representation of the linear transformation process of the method of FIG. 4.

FIG. 5 illustrates a graphical representation of the matrix operation which generates the vectors of self attention or attention heads 445 of the method of FIG. 4. As illustrated, the vector of self attention Z is generated based on a softmax function, also known as a softargmax function, or a normalized exponential function, operating on the query Q, key K, and value V matrices generated by the linear transformation systems 425, 430, and 435.

FIG. 6 is a system block diagram of a system which trains one or more AI engines of an arrival time predictor, such as predictor 210 of object delivery time estimation system 200 of FIG. 2 according to some embodiments. In some embodiments, the arrival time predictor has one or more artificial intelligence engines which are trained using, for example, 4 types of features: (1) knowledge features, for example, including driver knowledge features 610 and address knowledge features 615, (2) route encodings 620, (3) dynamic features 625, and (4) package features 630. In the illustrated embodiment, these features are concatenated at concatenate system 635 and fed into a fully connected neural net layer 640. In some embodiments, the training targets are a time interval between the most recent visited stop and all to-bevisited stops in the delivery schedule. In some embodiments, a minimum square error is used as a loss function 645, which the training routine minimizes or reduces to satisfy a target, as understood by those of skill in the art. In some embodiments, the AI engines of an object delivery time estimation system are trained offline.

The driver knowledge embedding 610 and the target address knowledge embedding 615 are generated by knowledge embedding layer 650. As illustrated, knowledge embedding layer 650 receives ontology data 655, such as that represented in ontology 300, discussed above, and receives historical data 660 which is annotated in accordance with the ontology data 655. The historical data 660 may be related to, for example, drivers, deliveries, packages, addresses, and other relevant characteristics for each of a large number of previously completed deliveries of each of a large number of completed delivery routes. In addition, the knowledge embedding layer 650 is configured to generate the driver knowledge embedding 610 and the target address knowledge embedding 615 based on the ontology data 655 and the historical data 660.

The knowledge embedding layer 650 also generates visited address knowledge embedding 665 based on the ontology data 655 and the historical data 660. In some embodiments, the visited address knowledge embedding 665 represents information for delivery destinations previously completed in the schedule.

Route encoder 670 receives visited address knowledge embedding 665 and positional encoding 675 and generates route encodings 620 using features similar or identical to those described above with reference to FIG. 4.

Dynamic features 625 may represent characteristics or circumstances which may change over time or are subject to change over the time of a delivery route or over the time between adjacent stops of a delivery rout. The dynamic features may, for example, include current timestamp, traffic, real-time weather, weather predictions, and driver's schedule (e.g., driver breaks, meal times, etc). The dynamic features may be used to provide information so that the trained AI model can generate delivery time predictions based on corresponding changing characteristics or circumstances during a delivery route.

The package features 630 may, for example, be related to particular features of the objects to be delivered, including size, weight, quantity, etc.

As understood by those of skill in the art, an arrival time predictor, such as predictor 210, may generate object delivery time estimates based on other inputs, and the one or more AI engines of the arrival time predictor may be trained based on corresponding historical data according to principles similar or identical to those represented in FIG. 6 and the discussion thereof.

As an example, suppose that:

there are 100 stops in 1 route each stop is labeled in sequence: $\{S\_1, S\_2, \ldots, S\_100\}$ each stop has packages $\{P1, P2, \ldots, P100\}$ each stop has an arrival time $\{T\_1, T\_2, \ldots T\_100\}$.

the most recent visited stop is $S\_x$

At any time T, a predictor model "f" may be trained, according to the training represented in FIG. 6, for example, using the patterns below, where "KGE" is "knowledge embedding", "RE" is "routeencoding", and "DF_T" is "dynamic features" at time T):

$f(KGE(driver), KGE(S\_(x+1)), RE(\{S1, S2, \ldots, Sx\}),$
$\quad DF\_T, P2) \rightarrow (T\_(x+1)-T\_x)$ $f(KGE(driver), KGE(S\_(x+2)), RE(\{S1, S2, \ldots, Sx\}),$
$\quad DF\_T, P3) \rightarrow (T\_(x+2)-T\_x)$

. . .

f(KGE(driver), KGE(S100), RE({S1, S2, . . . , Sx}),
   DF_T, P100)→(T_100–T_x);
and where the route encoder and encoding is performed
   according to the features described above with refer-
   ence to FIG. 4.

Figure 7:
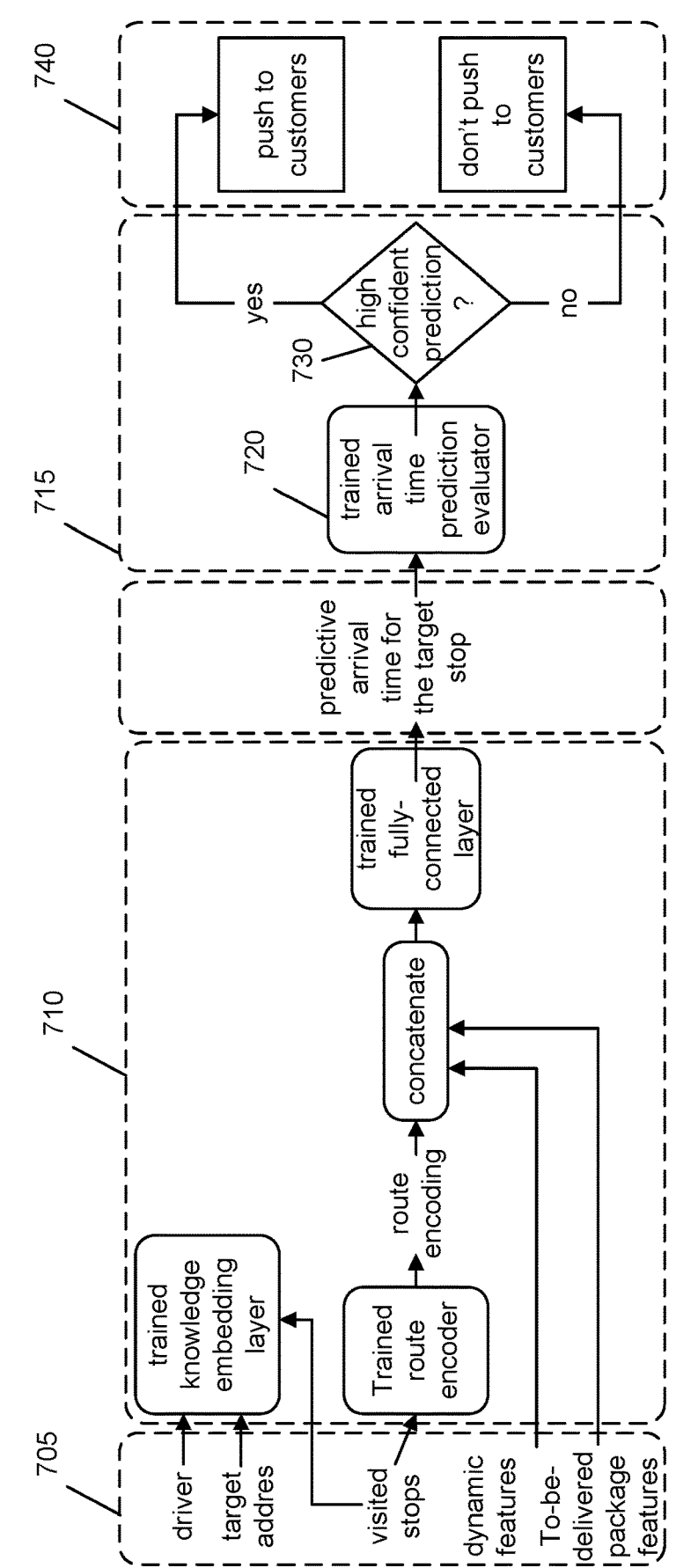
FIG. 7 is a block diagram of an object delivery time estimation system according to some embodiments.

FIG. 7 is a more detailed block diagram of an object
delivery time estimation system 700 according to some
embodiments. Object delivery time estimation system 700
may, for example, be used as estimator 160 of object
management system 100. Object delivery time estimation
system 700 may be used in other embodiments of object
management systems, and object management systems may
use alternative embodiments of object delivery time estima-
tion system 700.

Object delivery time estimation system 700 includes
predictor 710, evaluator 720, confidence determination sys-
tem 730, and publication system 740. Predictor 710 predicts
object delivery times based on certain inputs, and the
evaluator 720 examines predictions and generates a confi-
dence score to determine whether to publish the object
delivery time predictions made by the predictor 710.

As illustrated, in this embodiment, predictor 710 receives
inputs 705. Based on the inputs 706, the predictor 710
generates arrival time estimates 715 for object deliveries at
a target addresses according to a knowledge embedding
layer and according to a route encoder based on aspects
discussed above. The knowledge embedding layer and the
route encoder have been previously trained according to
aspects discussed above.

The evaluator 720 examines predictions and generates a
confidence score to determine whether to publish the arrival
time estimates made by the predictor 710, for example,
according to features and aspects similar or identical to those
described above with reference to evaluator 220 discussed
above.

Confidence determination system 730 receives the confi-
dence scores for each arrival time estimate and determines
whether to publish data representing the arrival time esti-
mates by pushing notifications to users. Data representing
the arrival time estimates are published by publication
system 740 at least to corresponding individuals expecting
deliveries for those arrival time estimates having confidence
scores representing a confidence exceeding a confidence
threshold. In some embodiments, data representing the
arrival time estimates are not published by publication
system 740 at least to corresponding individuals expecting
deliveries for those arrival time estimates having confidence
scores representing a confidence less than the confidence
threshold.

Publication system 740 is configured to conditionally
publish data representing arrival time estimates according to
whether the corresponding confidence scores generated by
confidence determination system 730 indicate sufficient con-
fidence in the arrival time estimates.

Figure 8:
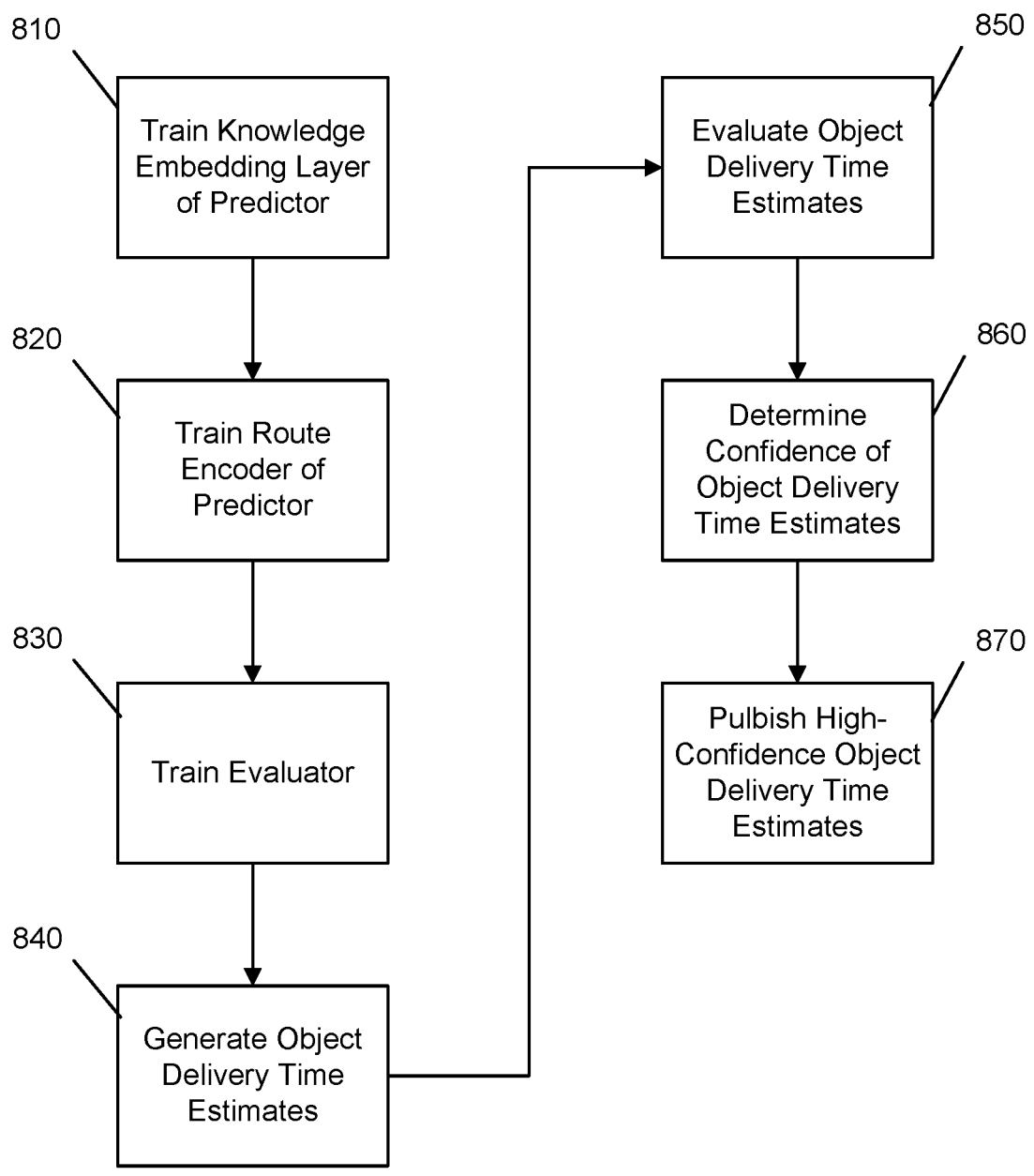
FIG. 8 is a flowchart diagram of a method of using an object delivery time estimation system according to some embodiments.

FIG. 8 is a flowchart diagram of a method 800 of using an
object delivery time estimation system, such as object deliv-
ery time estimation system 200 of FIG. 2, according to some
embodiments. Some or all of the process 800 (or any other
processes described herein, or variations, and/or combina-
tions thereof) may be performed under the control of one or
more computer systems, for example, including a controller,
such as controller 180, configured with executable instruc-
tions and may be implemented as code (e.g., executable
instructions, one or more computer programs, or one or
more applications) executing collectively on one or more
processors, by hardware or combinations thereof. The code may be stored on a computer-readable storage medium, for
example, in the form of a computer program comprising a
plurality of instructions executable by one or more proces-
sors. The computer-readable storage medium may be non-
transitory.

At 810, one or more AI engines of a knowledge embed-
ding layer of a predictor, such as predictor 210 of FIG. 2 is
trained. For example, the AI engines of the knowledge
embedding layer may be trained according to principles
discussed above with reference to FIG. 6.

At 820, one or more AI engines of a route encoder of a
predictor, such as predictor 210 of FIG. 2 is trained. For
example, the AI engines of the route encoder may be trained
according to principles discussed above with reference to
FIG. 6.

At 830, one or more AI engines of an evaluator, such as
evaluator 220 of FIG. 2 is trained. For example, the AI
engines of the evaluator may be trained according to prin-
ciples discussed above with reference to FIG. 2.

At 840, object delivery time estimates are generated, for
example with the predictor. For example, the predictor may
generate object delivery time estimates according to prin-
ciples similar or identical to those discussed above with
reference to predictor 210.

At 850, the object delivery time estimates are evaluated
with the evaluator. For example, the evaluator may evaluate
the object delivery time estimates according to principles
similar or identical to those discussed above with reference
to evaluator 220.

At 860, a confidence score of each of the object delivery
time estimates is compared with a threshold with a confi-
dence determination system. For example, the confidence
determination system may determine the confidence score of
each of the object delivery time estimates according to
principles similar or identical to those discussed above with
reference to confidence determination system 230.

At 870, the object delivery time estimates having confi-
dence scores greater than the threshold are published with a
publication system. For example, the object delivery time
estimates having confidence scores greater than the thresh-
old may be published according to principles similar or
identical to those discussed above with reference to publi-
cation system 240.

Figure 9:
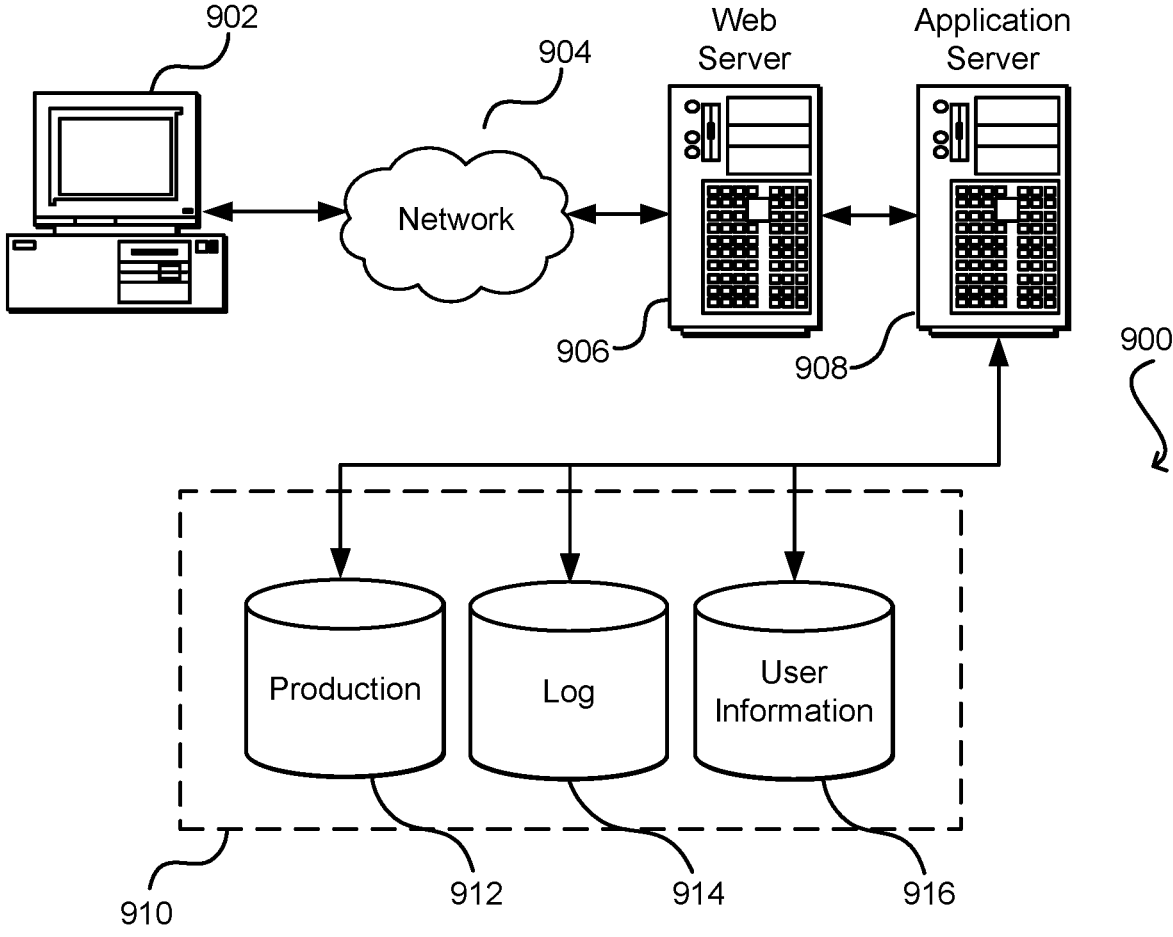
FIG. 9 illustrates an environment in which various embodiments can be implemented.

FIG. 9 illustrates aspects of an example environment 900
for implementing aspects in accordance with various
embodiments. As will be appreciated, although a Web-based
environment is used for purposes of explanation, different
environments may be used, as appropriate, to implement
various embodiments. The environment includes an elec-
tronic client device 902, which can include any appropriate
device operable to send and receive requests, messages, or
information over an appropriate network 904 and convey
information back to a user of the device. Examples of such
client devices include personal computers, cell phones,
handheld messaging devices, laptop computers, set-top
boxes, personal data assistants, electronic book readers, and
the like. The network can include any appropriate network,
including an intranet, the Internet, a cellular network, a local
area network, or any other such network or combination
thereof. Components used for such a system can depend at
least in part upon the type of network and/or environment
selected. Protocols and components for communicating via
such a network are well known and will not be discussed
herein in detail. Communication over the network can be
enabled by wired or wireless connections and combinations
thereof. In this example, the network includes the Internet,
as the environment includes a Web server 906 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 902. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 906 or other servers over the network 904 or other networks.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 900 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

training, by a computing system, one or more knowledge artificial intelligence (AI) engines of a knowledge embedding layer of a predictor of an object delivery time estimation system, the predictor being configured to generate object delivery time predictions;

training, by the computing system, one or more route artificial intelligence (AI) engines of a route encoder of the predictor of the object delivery time estimation system;

training, by the computing system, one or more evaluator artificial intelligence (AI) engines of an evaluator of the object delivery time estimation system, the evaluator being configured to generate a confidence score for each object delivery time prediction;

generating a route encoding by:

providing an input vector to a linear transform matrix system, wherein the input vector includes an address of a finished stop and addresses for each uncompleted stop on a delivery route, wherein the linear transform matrix system linearly transforms the input vector;

receiving a key, a query, and a value based at least on an output of the linear transform matrix system;

providing the key, the query, and the value to a multi-headed attention algorithm;

receiving, from the multi-headed attention algorithm, vectors of self-attention; and generating, based at least in part on the vectors of self-attention, a route encoding;

receiving, by the computing system, information that identifies a finished stop on a delivery route;

generating, by the predictor, a plurality of object delivery time predictions for each uncompleted stop on the delivery route, wherein the plurality of object delivery time predictions are generated based at least in part on the route encoding generated using the multi-headed attention algorithm;

generating, by the evaluator, a confidence score for each object delivery time prediction of the plurality of object delivery time predictions for each uncompleted stop on the delivery route;

detecting, by the computing system, a position of a delivery vehicle based at least in part on the information;

adjusting, by the computing system, the delivery route based at least in part on the position of the delivery vehicle and the route encoding;

causing, by the computing system, execution of a delivery to one or more uncompleted stops on the delivery route based at least in part on the adjusted delivery route;

generating, by a confidence determination system, a publication determination for each particular object delivery time prediction based on the confidence score associated with each particular object delivery time prediction, the publication determination indicating whether to publish the particular object delivery time prediction or to not publish the particular object delivery time prediction;

publishing, by the computing system, each particular object delivery time predictions on the delivery route having confidence scores indicating confidence greater than a confidence threshold to corresponding devices; and not publishing each particular object delivery time predictions on the delivery route having confidence scores indicating confidence less than the confidence threshold to corresponding devices.

2. The computer-implemented method of claim 1, wherein the plurality of object delivery time predictions are generated based at least in part on a knowledge graph.

3. The computer-implemented method of claim 1, wherein the plurality of object delivery time predictions are generated based at least in part on a multi-headed attention algorithm.

4. The computer-implemented method of claim 1, wherein the plurality of object delivery time predictions are generated with a resolution of single minutes.

5. A computer system, comprising:

one or more processors; and a memory storing executable instructions that, upon execution by the one or more processors, cause the computer system to execute operations to:

generate a route encoding by:

providing an input vector to a linear transform matrix system, wherein the input vector includes an address of a finished stop and addresses for each uncompleted stop on a delivery route, wherein the linear transform matrix system linearly transforms the input vector;

receiving a key, a query, and a value based at least on an output of the linear transform matrix system;

providing the key, the query, and the value to a multi-headed attention algorithm;

receiving, from the multi-headed attention algorithm, vectors of self-attention; and generating, based at least in part on the vectors of self-attention, a route encoding;

receive information that identifies the finished stop on the delivery route;

generate, by a predictor of an object delivery time estimation system, a plurality of object delivery time predictions for each uncompleted stop on the delivery route, the predictor comprising one or more trained predictor artificial intelligence (AI) systems collectively configured to generate object delivery time predictions, wherein the plurality of object delivery time predictions are generated based at least in part on the route encoding generated using the multi-headed attention algorithm;

generate, by an evaluator of the object delivery time estimation system, a confidence score for each object delivery time prediction of the plurality of object delivery time predictions for each uncompleted stop on the delivery route, the evaluator comprising one or more trained evaluator artificial intelligence (AI) systems collectively configured to generate the confidence scores;

detect, by the computer system, a position of a delivery vehicle based at least in part on the information;

adjust, by the computer system, the delivery route based at least in part on the position of the delivery vehicle and the route encoding;

cause, by the computer system, execution of a delivery to one or more uncompleted stops on the delivery route based at least in part on the adjusted delivery route;

generate, by a confidence determination system of the object delivery time estimation system, a publication determination for each particular object delivery time prediction based on the confidence score associated with each particular object delivery time prediction, the publication determination indicating whether to publish the particular object delivery time prediction or to not publish the particular object delivery time prediction;

publish, by a publication system, each particular object delivery time predictions on the delivery route having confidence scores indicating confidence greater than a confidence threshold to corresponding devices; and not publish each particular object delivery time predictions on the delivery route having confidence scores indicating confidence less than the confidence threshold to corresponding devices.

6. The computer system of claim 5, wherein the plurality of object delivery time predictions are generated based at least in part on a knowledge graph.

7. The computer system of claim 5, wherein the plurality of object delivery time predictions are generated based at least in part on a multi-headed attention algorithm.

8. The computer system of claim 5, wherein the plurality of object delivery time predictions are generated with a resolution of single minutes.

9. The computer system of claim 5, wherein the plurality of object delivery time predictions are generated based at least in part on dynamic features.

10. The computer system of claim 5, wherein the plurality of object delivery time predictions are generated based at least in part on package features.

11. The computer system of claim 5, further comprising, wherein the executable instructions, upon execution by the one or more processors, cause the computer system to execute operations to, recalculate, with the predictor, one or more of the plurality of object delivery time predictions in response to a completed delivery.

12. A computer-readable storage medium storing computer-executable instructions that, when executed by one or more processors of a computing device, cause the computing device to:

generate a route encoding by:

providing an input vector to a linear transform matrix system, wherein the input vector includes an address of a finished stop and addresses for each uncompleted stop on a delivery route, wherein the linear transform matrix system linearly transforms the input vector;

receiving a key, a query, and a value based at least on an output of the linear transform matrix system;

providing the key, the query, and the value to a multi-headed attention algorithm;

receiving, from the multi-headed attention algorithm, vectors of self-attention; and generating, based at least in part on the vectors of self-attention, a route encoding;

receive information that identifies the finished stop on the delivery route;

generate, by a predictor of an object delivery time estimation system, a plurality of object delivery time predictions for each uncompleted stop on the delivery route, wherein the plurality of object delivery time predictions are generated based at least in part on the route encoding generated using the multi-headed attention algorithm;

generate, by an evaluator of the object delivery time estimation system, a confidence score for each object delivery time prediction of the plurality of object delivery time predictions for each uncompleted stop on the delivery route;

detect, by the object delivery time estimation system, a position of a delivery vehicle based at least in part on the information;

adjust, by the object delivery time estimation system, the delivery route based at least in part on the position of the delivery vehicle and the route encoding;

cause, by the object delivery time estimation system, execution of a delivery to one or more uncompleted stops on the delivery route based at least in part on the adjusted delivery route;

generate, by a confidence determination system of the object delivery time estimation system, a publication determination for each particular object delivery time prediction based on the confidence score associated with each particular object delivery time prediction, the publication determination indicating whether to publish the particular object delivery time prediction or to not publish the particular object delivery time prediction;

publish, by a publication system, each particular object delivery time predictions on the delivery route having confidence scores indicating confidence greater than a confidence threshold to corresponding devices; and not publish each particular object delivery time predictions on the delivery route having confidence scores indicating confidence less than the confidence threshold to corresponding devices.

13. The computer-readable storage medium of claim 12, wherein the plurality of object delivery time predictions are generated based at least in part on a knowledge graph.

14. The computer-readable storage medium of claim 12, wherein the plurality of object delivery time predictions are generated based at least in part on a multi-headed attention algorithm.

15. The computer-readable storage medium of claim 12, wherein the plurality of object delivery time predictions are generated with a resolution of single minutes.

16. The computer-readable storage medium of claim 12, wherein the plurality of object delivery time predictions are generated based at least in part on dynamic features.

17. The computer-readable storage medium of claim 12, wherein the plurality of object delivery time predictions are generated based at least in part on package features.

18. The computer-readable storage medium of claim 12, wherein the plurality of object delivery time predictions are generated based at least in part on route encodings generated using a multi-headed attention algorithm.

19. The computer-readable storage medium of claim 12, further comprising, with the predictor, recalculating one or more of the plurality of object delivery time predictions in response to a completed delivery.

* * * * *